(12) United States Patent
Stettner et al.

(10) Patent No.: US 9,874,639 B2
(45) Date of Patent: *Jan. 23, 2018

(54) LASER RANGING, TRACKING AND DESIGNATION USING 3-D FOCAL PLANES

(71) Applicant: Continental Advanced Lidar Systems US. LLC., Carpinteria, CA (US)

(72) Inventors: Roger Stettner, Santa Barbara, CA (US); Howard W. Bailey, Santa Barbara, CA (US)

(73) Assignee: CONTINENTAL ADVANCED LIDAR SOLUTIONS US, LLC., Carpinteria, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/742,578

(22) Filed: Jun. 17, 2015

(65) Prior Publication Data
US 2015/0331112 A1    Nov. 19, 2015

Related U.S. Application Data

(63) Continuation of application No. 14/075,677, filed on Nov. 8, 2013, now Pat. No. 9,087,387, which is a continuation of application No. 13/723,656, filed on Dec. 21, 2012, now Pat. No. 8,606,496, which is a continuation of application No. 13/412,134, filed on Mar. 5, 2012, now Pat. No. 8,358,404, which is a continuation of application No. 12/096,311, filed as application No. PCT/US2006/061788 on Dec. 8, 2006, now Pat. No. 8,130,367.

(60) Provisional application No. 60/748,690, filed on Dec. 8, 2005.

(51) Int. Cl.
| | |
|---|---|
| *G01S 17/93* | (2006.01) |
| *G05D 1/02* | (2006.01) |
| *G01C 21/20* | (2006.01) |
| *G01S 7/481* | (2006.01) |
| *G01S 7/486* | (2006.01) |
| *G01S 17/66* | (2006.01) |
| *G01S 17/87* | (2006.01) |
| *G01S 17/89* | (2006.01) |
| *H04N 13/02* | (2006.01) |
| *G06T 7/292* | (2017.01) |

(52) U.S. Cl.
CPC .............. *G01S 17/93* (2013.01); *G01C 21/20* (2013.01); *G01S 7/4813* (2013.01); *G01S 7/4814* (2013.01); *G01S 7/4863* (2013.01); *G01S 17/66* (2013.01); *G01S 17/87* (2013.01); *G01S 17/89* (2013.01); *G01S 17/936* (2013.01); *G05D 1/02* (2013.01); *G06T 7/292* (2017.01); *H04N 13/0253* (2013.01)

(58) Field of Classification Search
CPC .......... G01S 17/00; G01S 17/89; G01S 7/486; G01S 7/48; G01S 7/481
See application file for complete search history.

(56) References Cited

U.S. PATENT DOCUMENTS

| | | | |
|---|---|---|---|
| 6,414,746 B1 * | 7/2002 | Stettner | G01S 7/4816 250/332 |
| 2005/0278098 A1 * | 12/2005 | Breed | B60R 21/0134 701/45 |

* cited by examiner

*Primary Examiner* — Luke D Ratcliffe (57) ABSTRACT

The present invention tracks or locates small moving objects, or generates a 3-D frame of data by using 3-D focal plane arrays with low laser energy and few mechanically moving parts. The invention may be used to determine the direction of a laser designating a target, for target tracking, used as a 3-D movie/video camera or used to provide data for autonomous navigation.

17 Claims, 7 Drawing Sheets

Figure 7 his application is a continuation of application Ser. No. 14/075,677, filed Nov. 8, 2013, which is a continuation of application Ser. No. 13/723,656, filed Dec. 21, 2012, which is a continuation of application Ser. No. 13/412,134, filed Mar. 5, 2012, which is a continuation of application Ser. No. 12/096,311, which was a National Stage of International Application No. PCT/US2006/061788, filed Dec. 8, 2006, which claims the benefit of U.S. Provisional Application Nos. 60/748,690, filed Dec. 8, 2005, the disclosures of which are incorporated herein by reference.

LASER RANGING, TRACKING AND DESIGNATION USING 3-D FOCAL PLANES

FIELD OF THE INVENTION

This invention relates to laser pulse imaging of three dimensional objects. In particular it relates to embodiments of such technology for target acquisition and tracking, collision avoidance or navigation.

BACKGROUND OF THE INVENTION

The 3~D imaging technology disclosed in Stettner et al, U.S. Pat. Nos. 5,446,529, 6,133,989 and 6,414,746 provides the use of a single pulse of laser light to capture the information and content of a 2-D image along with a third dimension depth coordinate; thereby providing the 3-D coordinates of object points in its field of view, This has been referred to as flash 3~D imaging in analogy with ordinary digital 2~D cameras using flash attachments for a self contained source of light. As with ordinary 2-D digital cameras, the light reflected from an object is focused by a lens onto the focal plane of the camera, which is divided into an array of pixels called a focal plane array (FPA} In the case of a 3-D camera these pixels are "smart' and can collect data from which the time of flight of the laser pulse to the object of interest can be calculated as well as data associated with the returning laser pulse shape and magnitude. Because of the similarity to radar imaging, the laser light is also referred to as flash ladar, These flash 3-D cameras are an improvement upon designs in which one or more pixels is scanned over the field of view. They eliminate the need for a precision mechanical scanner, which is costly and high maintenance; since the location of the pixels in the focal plane may be automatically registered due to their permanent positions within an array.

An additional virtue of flash ladar is its ability to capture an entire scene in one exposure despite the rapid motion of parts or sections of targets (such as the rotary blade of a helicopter) or rapid motion of the 3D camera's sensor platform. During the time it takes light to reach the target and return to the sensor, mechanical systems typically do 110t move fast enough to cause pixel blurring. A time sequence of 3-D flash ladar frames comprises a 3-D movie video of the scene.

BRIEF DESCRIPTION OF THE INVENTION

The present invention comprises apparatus and methods for flash 3D systems adapted for acquisition and tracking system suitable for military uses, collision avoidance systems suitable for vehicular traffic, navigational systems and 3D motion picture systems, the latter being particularly suited for the development of video games.

The apparatus of the present invention comprises a laser source, a lens, a 3-D FPA and electronics to control the 3-D FPA, data derived from the 3-D FPA and process the data. Each pixel in the 3-D FPA comprises structures to convert the light falling on it into an electronic signal whose magnitude is sampled in time and stored in memory within the pixel. Each pixel also comprises a clock that reports the times at which the samples are taken. Different embodiments of the invention specify various pulsed laser sources and optional 2-D sensors. The 2-D sensor data may be used to acquire targets or track targets in two dimensions for which the 3-D data may provide the target range to the pixel as a third dimension. The 2-D data may also be overlaid or textured on the 3-D data to generate more realistic, higher resolution 3-D movies for human viewing.

It is an object of the present invention, in separate embodiments, to locate or track small stationary or moving objects, to develop full-frame 3-D images, or to locate laser-designated targets with a minimum of laser energy, a minimum of mechanical motion or both.

It is another object of the present invention to provide a system employing full-frame 3-D images in a collision avoidance system.

It is a further object of the present invention to provide a system employing full-frame 3-D images in a navigation or a reconnaissance system.

It is a still further object of the present invention to provide a system employing full-frame 3-D images in a 3-D movie/video.

It is still further the object of the present invention to provide apparatus and a method to identify the direction of a laser beam designating the platform on which the present invention is placed or to locate the direction of a laser spot on a distant object.

Among the advantages of this device is the novel use of technology having mechanical simplicity and low energy requirements for operation. The low weight and low volume for the device are additional advantages and stem from the mechanical simplicity, the low energy requirements or both. Other advantages and uses of the invention will be apparent to those skilled in the art.

DESCRIPTION OF THE PREFERRED EMBODIMENTS

When generating a flash image with a 3-D FPA, each pixel must receive enough laser energy so that a 3-D image can be generated. The farther the object of interest is from the camera the greater the output laser energy required. Since for long-range systems, cost and power is related to the laser energy, reducing the requirement for laser power is a benefit. If the object of interest is only a few pixels in size, is far away, and could be anywhere in the entire field of view of the 3-D FPA, it is most economical to narrow the transmitted laser beam to be only a few pixels in width and to scan the laser beam. Since scanning a laser beam requires only a very small, inexpensive and extremely reliable galvanometer scanner the present invention replaces the full flash ladar system by a cheaper, lower power and sometimes-lower weight and lower volume Energy-Reduced Flash Ladar System (ERFLS).

In one embodiment a 2-D sensor acquires the object of interest and passes the 2-D coordinates to the ERFLS for tracking. In another embodiment of the invention the laser beam is rapidly scanned to find the object of interest within a time of concern, as in a collision avoidance system where the object of interest may be a thin cable or wire. In still another embodiment of the invention, where the target motion is not too rapid, the entire image can be built up by scanning the laser beam over the full field of view. In this latter embodiment, pixel registration is not a problem because all pixels are automatically registered by being part of an array. Pixel registration, however, is a problem in a system where the pixel is mechanically scanned to obtain the image. A time sequence of ERFLS 3-D frames amounts to a 3-D movie/video of the scene which could be used in platform navigation.

There are situations in which one observer uses a pulsed laser beam to designate a particular object of interest by projecting a laser "spot" on the object. In one manifestation of this application the laser spot's two-dimensional coordinates are determined by a separate distant observer. Typically the distant observer scans a pixel or a small pixel array over the full field of view of the system searching for the laser spot. As with other mechanical systems that scan a pixel, this system is costly and high maintenance. In another embodiment of the present invention this scanned mechanical search system is replaced by a 3-D FPA, which takes in the full field of view of the pixel scanner. In a modification of this embodiment a 3-D FPA is used to identify the direction of laser beam attempting to locate the platform on which the 3-D FPA is mounted.

A preferred embodiment is described with reference to the figures where like numbers denote the same elements.

Figure 1:
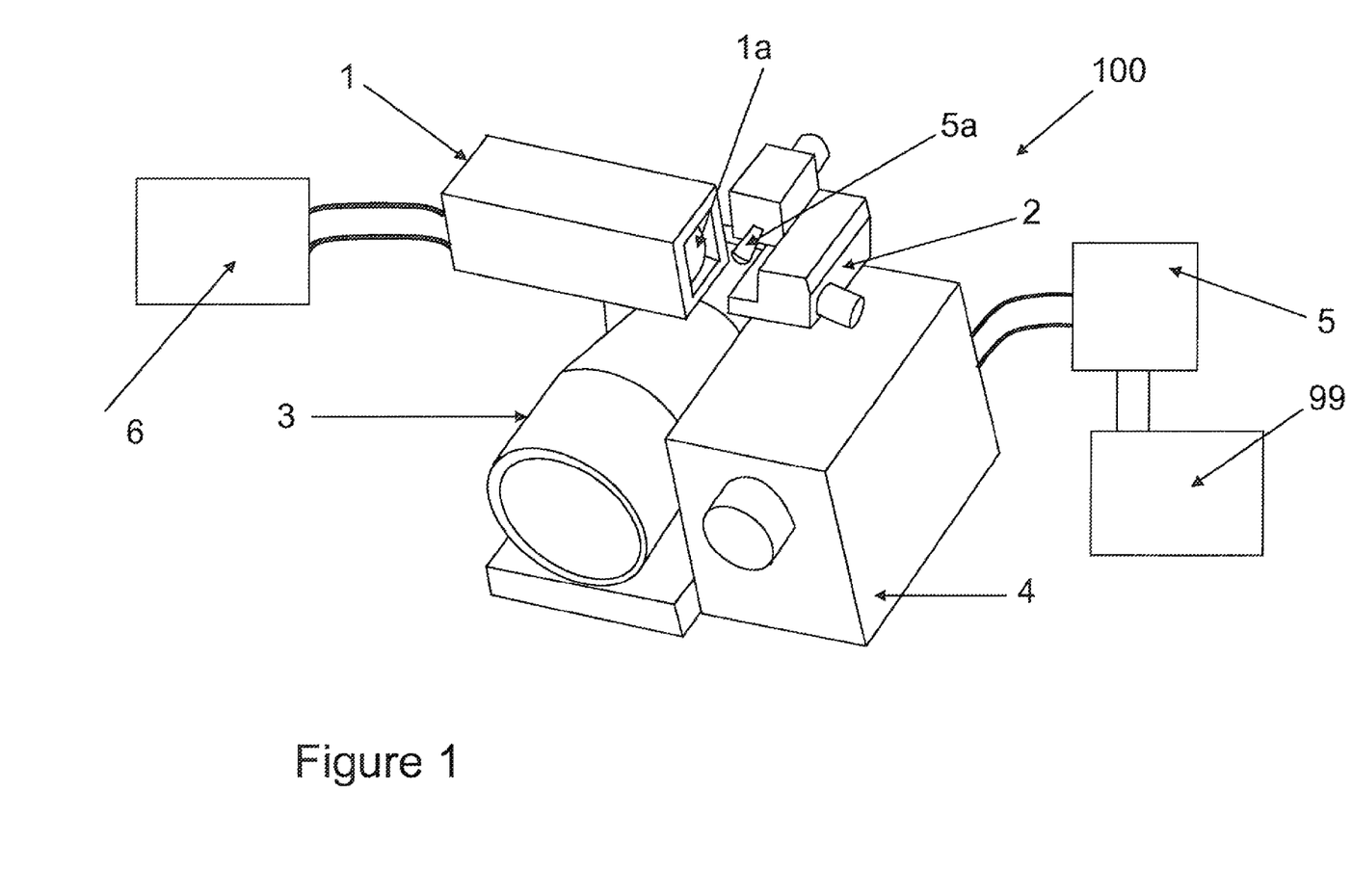
FIG. 1 is a perspective drawing of the present invention intended to acquire and track moving objects or to locate objects in its field of view.

A preferred embodiment of the present invention, depicted in FIG. 1, is an acquisition and tracking system. It is comprised of a pulsed light source 1, compact scanning mirror system 2, including a scanning mirror 5a, a 3-D sensor 3, a 2-D acquisition sensor 4, and a control computer 5 to store and process data. In other embodiments where the present invention is used as a collision avoidance or navigation system the 2-D sensor may or may not be present. In addition where the objects in the field of view of the 3-D sensor are poor reflectors of the light from the pulsed light source 1, the pulsed light source may generate enough power so that a cooler 6 is necessary to cool the pulsed light source 1. For those circumstances where a cooler is required the cooler 6 is part of the acquisition and tracking system. Preferably, the light source is a pulsed laser that creates a pulse with a pulse width of a few, nanoseconds. For use with near objects, the invention may only require a pulse from a lower energy laser diode as the pulsed light source 1. The present invention may also include a response system 99 to react to the object being tracked. The light source may include a beam shaping element 1a, typically optics or a diffuser or both. The beam shaping element may be incorporated into the scanning mirror 5a as one or a system of electronically controlled mirrors. These latter mirrors may be a Micro-Electro-Mechanical System (MEMS) fabricated with nanotechnology.

Figure 2:
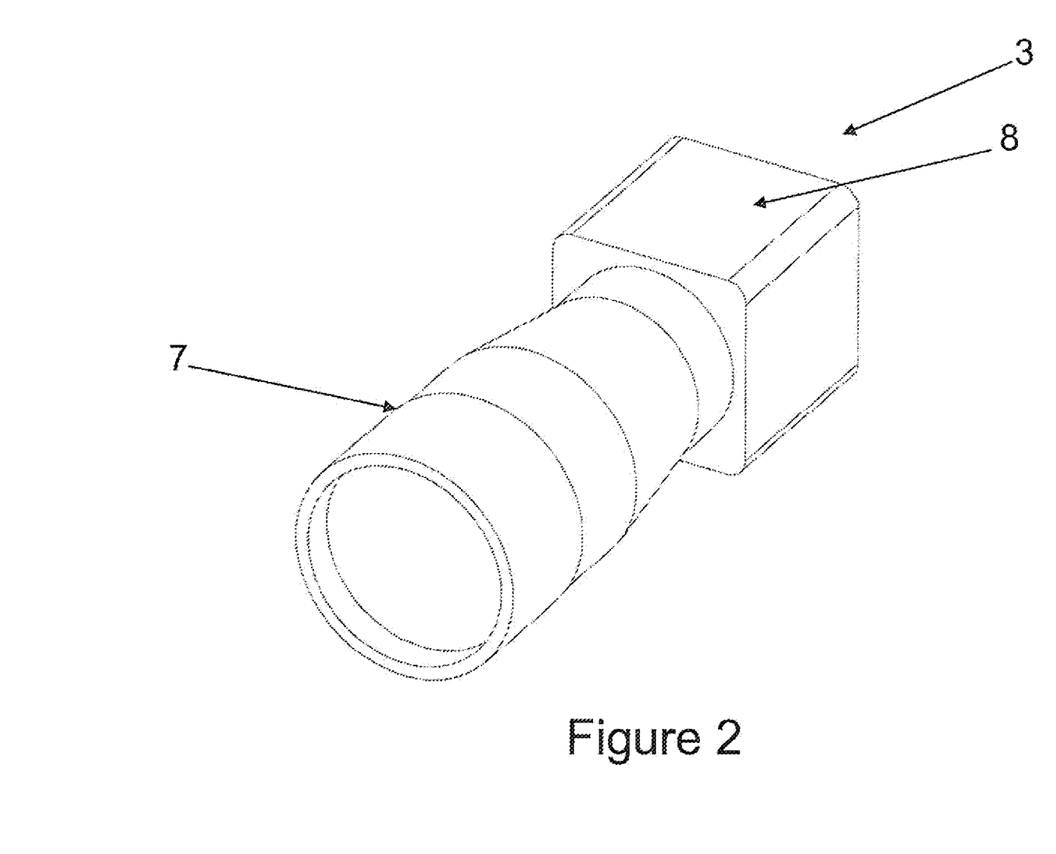
FIG. 2 shows 3-D sensor intended to locate objects in s field of view, and locate the direction of a laser beam falling upon the sensor.

The 3-D sensor 3 is shown in FIG. 2 and is comprised of a lens system 7 and a 3-D sensor housing 8. Inside the sensor housing 8 is the 3-D FPA 10 (see FIG. 3) and 3-D sensor drive and output electronics 9.

Figure 3:
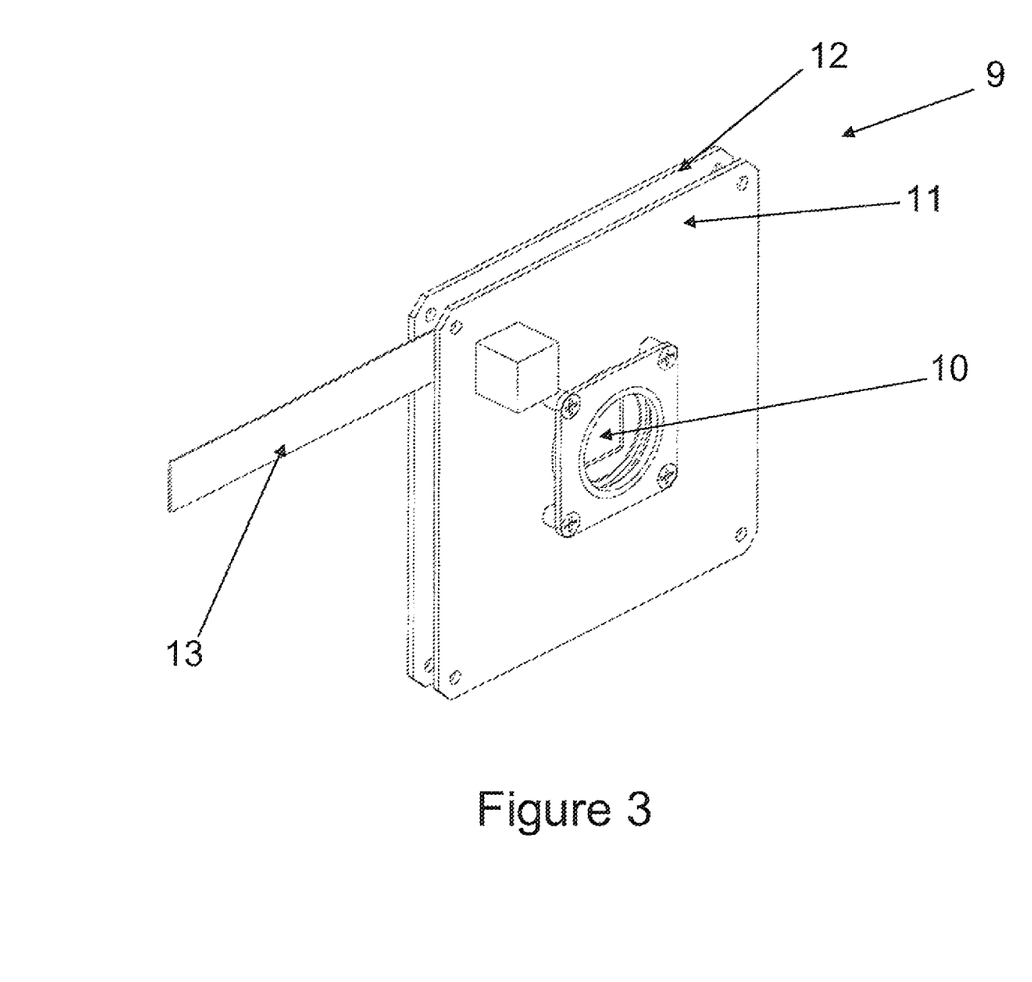
FIG. 3 shows the 3-D sensor electronics and focal plane array of the present invention.

FIG. 3 illustrates the 3-D sensor drive and output electronics 9, which is typically comprised of a drive board 11 and the output and interface electronics board 12. Typically the 3-D focal plane array (FPA) 10 is electrically and mechanically attached to a drive board 11, which provides the clocks and biases Io the Readout Integrated Circuit (ROIC) chip 14 (see FIG. 4) of the 3-D FPA. The drive board 11 may also provide the voltage biases required for the detector array 15 of the 3-D FPA 10. The output and interface electronics board is connected by means of a cable 13 or a transmitter or a direct mechanical and electrical connection to the control computer or computer board 5.

Figure 4:
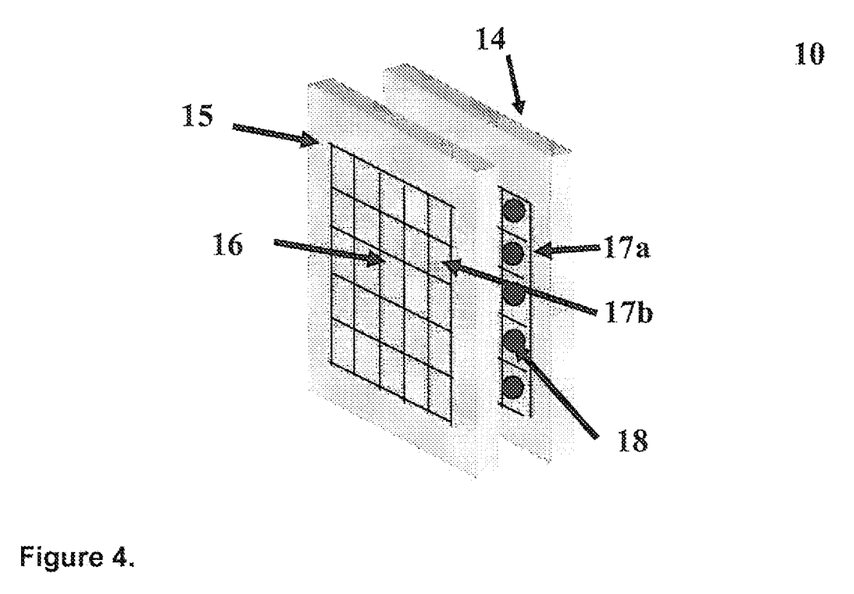
FIG. 4 is a diagram of the 3-D focal plane array of the present invention.

FIG. 4 shows the details of the FPA 10. The FPA 10 is comprised, in one embodiment, of a light sensitive detector array 15 and an ROIC 14. FIG. 4 indicates the detector array 15 and the ROIC chip 14 are divided into pixels 16 with a corresponding pixel 17b on the detector array 15 and a corresponding pixel 17a on the ROIC 14 that are electrically connected by a metallic bump 18. In another monolithic embodiment the light sensitive detector array 15 and ROIC array 14 chips are combined into one chip. In one preferred embodiment, the light sensitive detector array 15 is a P-intrinsic-N (PIN) or a N-intrinsic-P photodiode or a APD (avalanche photodiode) fabricated on a single, low resistivity semiconductor chip. In another embodiment, each light sensitive detector pixel 17b is incorporated into the readout pixel (or unit cell) 17a itself in a way known by those familiar with the art. This monolithic design eliminates the complexity of two chips (14 and 15) hybridized with metallic bumps 18.

Figure 5:
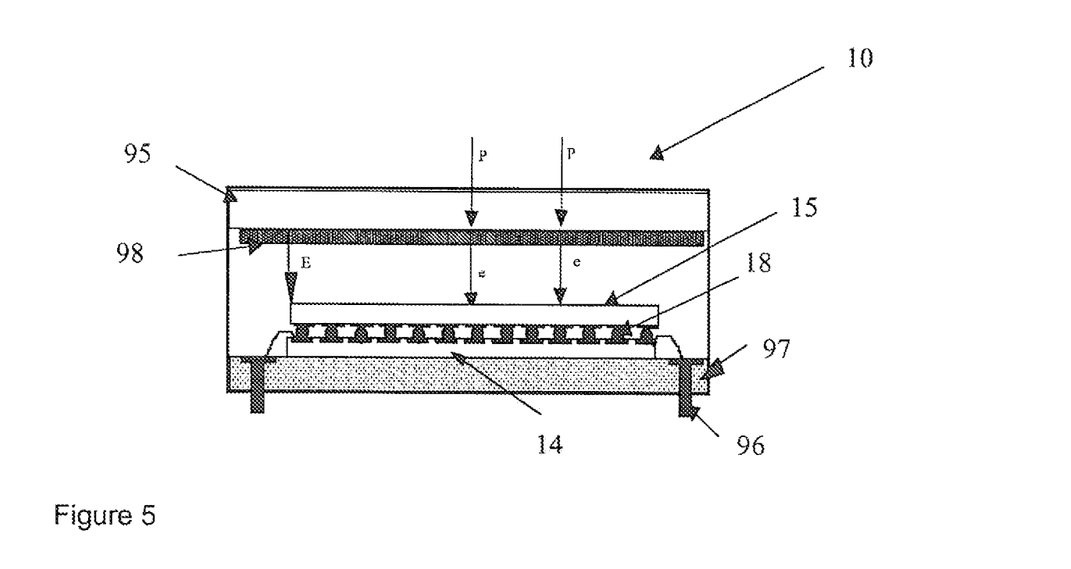
FIG. 5 is a high sensitivity 3-D focal plane array of the present invention, an image tube.

FIG. 5 shows an image tube embodiment of the FPA 10, in which the light sensitive detector array 15 is a silicon detector array and the detector array 15 and ROIC array 14 are incorporated into an evacuated enclosure where photons P pass through a transparent window 95, interact with the photocathode 98 of the image, producing photoelectrons e. The photoelectrons are accelerated into the detector array 15 by an electric field E producing an amplified electrical signal by impact ionization in the detector array. This amplified signal is then indistinguishable, when further processed, from a photon-produced electrical signal in the detector array. In the case of an image tube, control, timing and bias signals flow through the header of the image tube 97, which is electrically and mechanically attached, typically by pins 96 to the drive and output electronics 9. In another image tube embodiment of the FPA 10, a microchannel plate is the electron amplification mechanism and is placed between the photocathode and ROIC 14 hybridized to detector array 15, however the detector array 15 is replaced by an anode array. The anode array simply collects the amplified electrical signals from the microchannel plate and passes them on through metal bumps 18 to the ROIC 14. In another image tube embodiment of the 3-D FPA 10 the image tube is placed in a magnetic field resulting in a digicon. Image tubes, headers, photocathodes, microchannel plates, anode arrays and digicons are known to those skilled in the art of low-noise photon-signal amplification.

Figure 6:
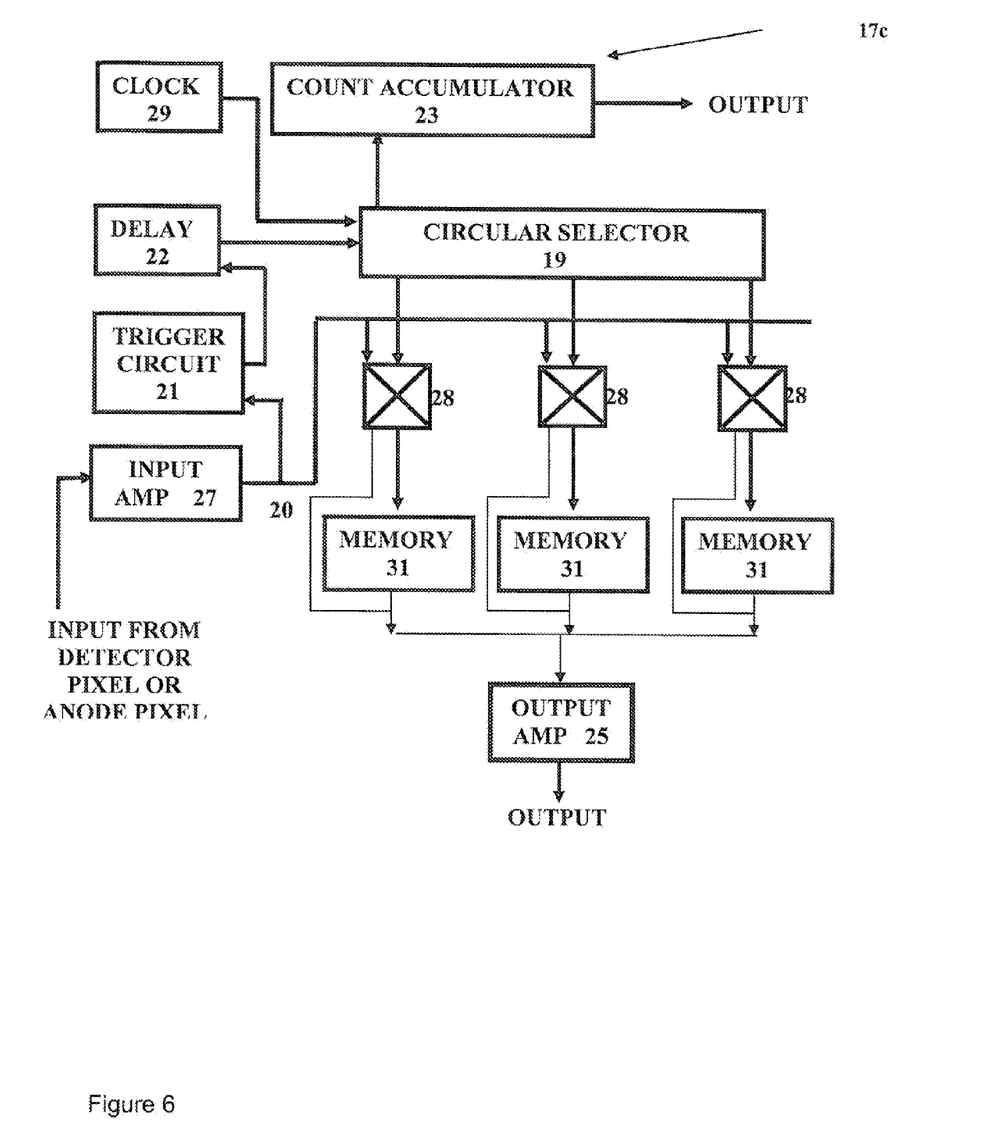
FIG. 6 is a diagram of the unit cell circuitry on the 3-D focal plane array of the current invention.

The electronic circuit 17c on each ROIC unit cell (pixel) 17a of the ROIC chip 14 is diagrammed on FIG. 6. Each unit cell circuit 17c contains an input amplifier 27, a trigger circuit 21 delay circuit 22, a circular selector 19, a count accumulator 23, and several switches 28 each connected to its own memory cell. An output amplifier 25 drives the data in the memory cells 31 out of the unit cell to a chip output amplifier which drives the data off the ROIC chip 14 and to the drive and output electronics 9. In alternate configurations of the ROIC unit cell 17a the clock 29 may enter the count accumulator 23 and the count accumulator 23 drive the circular selector 19. In an alternate configuration of the ROIC unit cell circuit 17c the count accumulator 23 and circular selector 19 may be combined. In still another alternate design ROIC unit cell 17a which, does not capture the laser pulse shape the circular selector 19, switches 28 and memory cells 31 may not be present.

In an alternate design of the ROIC chip 14 the unit cell data is not driven off the chip but driven to an on-chip processor, which processes the data. The processed data is then driven off the chip. The on-chip processor may be a parallel processor so that each row of unit cells has its own processor. In alternate designs groups of rows may be multiplexed to their own on-chip processor.

Figure 7:
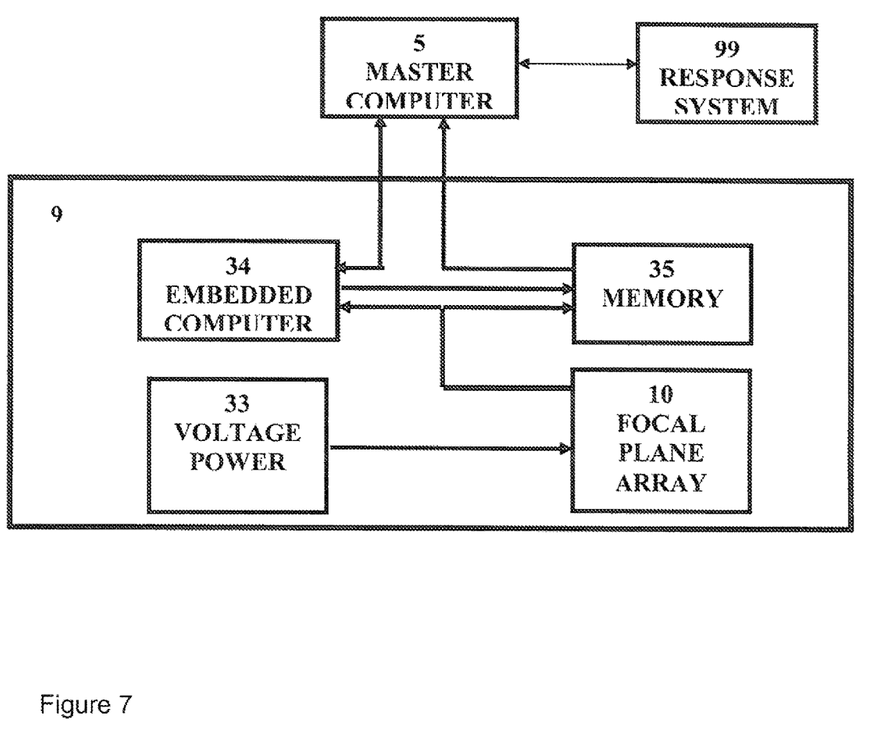
FIG. 7 is an electronic block diagram of the current invention.

A block diagram of the system electronics is displayed on FIG. 7, composed of the drive and output electronics 9 and the master computer 5. The focal plane array 10 receives its power and the bias voltages needed to run it from the power component 33. The embedded computer 34, typically a field programmable gate array (FPGA), generates the clock signals for the focal plane array 10 and the memory 35. These include the signals to initiate data acquisition, regulate raw data output from the focal plane array 10, and set options such as the clock frequency 29 and delay time 22. Data from the focal plane array 10 is completely or partially processed in the embedded computer 34 before being sent to the memory 35 and master computer 5 which may complete the processing, store the results and display the acquired three dimensional image or activate the response system 99. In another embodiment all the processing is performed on the embedded computer 34, with the master computer eliminated, and it activates the response system. The master computer 5 may permit an operator to communicate with the drive and output electronics 9 and, indirectly, the focal plane array 10.

The Acquisition and Tracking System

The acquisition and tracking system 100 operates as follows: The 2-D sensor 4, typically a visible or infrared sensor, acquires a target, which can be moving with respect to the acquisition and tracking system 100. Typical targets are rockets, mortars, rocket propelled grenades, bullets and initial light emissions generated when these targets are fired. The 2-D camera transfers the two-dimensional x,y coordinate position of the target either directly or by means of the computer 5 or embedded computer 34 to the two-axis scanning mirror system 2 which rapidly orients its mirror 5a in coordinates x and y so that a pulse of light from the pulsed light source 1, through the beam shaping element 1a, reflected from the mirror 5a will intersect the position of the target. The pulse of light emitted from the pulsed light source 1, traveling at the speed of light, intersects and reflects from the target. The reflected light is captured by the lens 7 of the 3-D sensor 3 and focused on the focal plane array 10 attached to the drive and output electronics 9 of the 3-D sensor. The target typically subtends one pixel 16 for acquisition and tracking but could subtend more than one, particularly if the embodiment used is for collision avoidance, navigation, reconnaissance or 3-D movies/videos.

The light pulse reflected from the target generates an electrical current in the detector pixel 17b representative of the pulse shape generated by the pulse light source 1. This current passes through the metal bump 18 and into the corresponding ROIC unit cell 17a. The target may modify the pulse shape but processing in the computer 5 or the drive and output electronics 9, embedded computer 34, will account for the pulse shape modification. The current from the detector pixel 17b is input to the ROIC unit cell circuitry 17c in the ROIC unit cell 17a and amplified by input amplifier 27 and then sampled and stored in memory cells 31. Only three memory units are shown in FIG. 6 although in the preferred embodiment many may exist. The sampling is accomplished by the clock 18, circular selector 19 and switches 28. The circular selector has as many outputs as memory cells 17. At each write clock pulse, the circular selector shifts turning on a separate and independent switch 28 which connects the input amplifier 27 output to one memory cell 31. After all memory cells have been filled the memory cells are overwritten as new data arrives. Consequently, the memory cells are always filled with the most recently sampled waveform data. The clock period is typically much shorter than the pulse width and so the pulse shape is captured in the memory cells 31. If the input amplifier 27 is a transimpedance amplifier the detector 17b current is transformed to a voltage and the memory cells 31 sample this voltage. If the input amplifier 27 is a current amplifier the detector 17b current is amplified and the memory cells 31 integrate this current. If the detector 17b signal is voltage the input amplifier 27 can be a voltage amplifier and the memory cells 31 sample this voltage. The circular selector 19 could be a simple sequential shift register but could be based upon an algorithm and therefore not sequential.

In one preferred embodiment, sampling begins when the light pulse is emitted. The count accumulator 23 starts counting after one complete circular selector cycle and continues incrementing the count with each subsequent circular selector cycle. The input amplifier 27 output is monitored by a trigger circuit 21, typically a Schmitt Trigger, which outputs a signal to a delay circuit 22 when the amplifier output 20 reaches a pre-specified or drive and output electronics 9 adjustable magnitude. After a preset, or drive and output electronics 9 adjustable, time delay, the delay circuit 22 stops the circular selector, which terminates the sampling and counting. The count accumulator 23 counts the number of times the circular selector has cycled or, in an alternate design, counts the number of clock pulses or equivalently the number of times the circular selector has shifted. In another preferred embodiment, sampling is begun in all pixels when a signal is input to the ROIC 14 from the drive and output electronics 9. In another or the same preferred embodiment, sampling is stopped when a signal is input to the ROIC 14 from the drive and output electronics 9; this signal can be programmed to occur at a specific time. The count accumulator 23 could be a simple digital counter but could be based on a algorithm and therefore not sequential. The algorithm would convert the output of the count accumulator 23 to the actual count.

In alternate designs the clock pulse is first input to the count accumulator, which drives the circular selector or the count accumulator and circular selector are combined into one element. If the count accumulator 23 drives the circular selector then the trigger circuit 21 signal stops the count accumulator.

After the laser pulse has been sampled, the data in all the memory cells is output by cycling through the circular selector at a lower frequency than the typical write frequency (the frequency that the data was sampled at). Typically the input amplifier 27 is disconnected from the unit cell circuitry 17c. The memory cell data is then driven from the unit cell to a chip output amplifier by the unit cell output amplifier 25. The chip output amplifier drives the memory cell data to the output and drive electronics 9, which processes the data and may transfer the data to the processing and storage computer 5. Similarly, the unit cell count accumulator 23 is output. This is typically a digital output when the clock is a series of pulses but could be analog if the clock is a ramp voltage. The memory cell output is typically analog but could be digital, particularly if the unit cell contained an analog to digital converter. Clock signals to output the data are generated in the embedded computer 34 of the drive and output electronics 9. Either the processing computer 5 or the embedded computer 34 computes the range to the target, the third independent coordinate z.

In the acquisition and tracking system 100 embodiment of the current invention he x,y position of the target pixel (17a and 17b) on the 3-D FPA 10 corresponds to the x,y position of the target as determined by the 2-D sensor 4, although typically the 2-D sensor has more pixels and its x,y position is more accurate. However, in another embodiment the detector array 15 of the 3-D FPA 10 is responsive to the ambient light reflected from the target or to the light emitted by the target and the 2-D acquisition camera can be eliminated by modifying the ROIC chip pixels 17a so they can integrate target-reflected ambient light or target-produced-light as well as capture system 100 generated pulsed light. In one embodiment eliminating the 2-D sensor the FIG. 6 unit cell circuit is biased so that one or more of the memory 31 integrate light at a low frequency typical of integrating sensors during acquisition mode. Once the target is acquired in 2-D mode and its x,y coordinates determined, the ROIC pixel circuit 17c is then immediately re-biased for 3-D range acquisition to obtain the z target coordinate.

The Moving Target Acquisition and Tracking System

When operating as a moving target acquisition and tracking system 100 the x,y coordinate of the moving target is tracked on the 2-D sensor and its corresponding z tracking coordinate is continually found using the 3-D sensor. Thus the target track is developed in the embedded computer 34 or processing computer 5, or an application specific integrated circuit (ASIC) replacement of the drive and output electronics 9, and can predict the origination point and termination point of the trajectory using algorithms known to experts in the art. The computer can then command a response based on the trajectory computation, in the case of a moving target, or when acquired in the case of a stationary target, from the response system 99. The response system may be a counter missile system, a counter shooter system, or vehicle control system.

Typically the z position of the target in the moving target acquisition and tracking system 100, and in all other embodiments which associate a range with a pixel 16, is determined both by the time at which the count accumulator 23 stops and the pulse shape data acquired from the memory cells 31. Only the count accumulator 23 data is necessary if range precision is to be determined within one or a few clock pulses. Range precision of a fraction of a clock pulse can be achieved using the laser pulse shape data from the memory cells 31. Although many different algorithms can be used, the most accurate is a comparison of the actual laser pulse shape with the pulse shape acquired from the memory cells 31. Typically the arrival time of the laser pulse or the time of the peak of the arriving laser pulse is estimated by a matched filter algorithm or a least squares algorithm. Although these algorithms are typically applied numerically they can, be implemented in circuitry.

The Collision Avoidance System

When operating as a collision avoidance system 100, operation may be similar to that described for the operation of the moving target acquisition and tracking system 100: the object to be avoided is first acquired using the 2-D sensor 4 operation, and the range to the object of interest results from the acquisition of a laser pulse by the 3-D sensor 3. However, typically the object of interest in these circumstances is defined by many pixels rather than one and may be scanned by a number of laser pulses, or just one, full field of view, laser pulse, to define the 3-D shape. The scanning pattern is typically defined or developed in the computer 5 but may be included in the firmware of an embedded computer 34 located on the drive and output electronics 9 or an application specific integrated circuit (ASIC) replacement of, the drive and output electronics. In addition the divergence of the laser pulse may be large enough to illuminate many target pixels with a single pulse so that only few laser pulses, or only one, are necessary to obtain the full 3-D image. In an alternate embodiment the 3-D focal plane may be re-biased to function as a 2-D acquisition sensor as well as a 3-D sensor and in still another embodiment the 3-D sensor may function as the acquisition sensor. If the system is designed so that only one laser pulse is necessary the scanning mirror system 2 may not be present and the laser 1 oriented so that, it illuminates the full field of view of the 3-D sensor 3 typically using a beam expanding element 1a.

In the embodiment of the collision avoidance or navigation system 100, where the 3-D sensor functions as an acquisition sensor, the 2-D sensor 4 is not, present and typically the pulse of light from the pulsed light source 1 has a beam divergence which illuminates many target pixels; 1000 pixels, is typical but all pixels may be illuminated by a single pulse. 3-D image data is transferred to the computer 5 in real time for each pulse of light and the 3-D image constructed from the scan. The laser beam scan will not generally be pixel by pixel but by groups of pixels until all the pixels in the field of view of the 3-D sensor 3 have been acquired. Then the scan will begin again. Typically the scan pattern will be located in the computer 5, in the embedded computer 34, or an ASIC substitute for the drive and output electronics 9. The embedded computer 34 or the control computer 5 analyzes the 3-D data and activates a response system 99 to avoid the collision or make navigation adjustments if necessary. Typical response systems include ailerons, steering brakes and accelerators. If power were not an issue the single laser flash could illuminate all the pixels in the field of view. If the system is designed so that only one laser pulse is necessary the scanning mirror system 2 may not be present and the laser 1 oriented so that it illuminates the full field of view of the 3-D sensor 3 typically using a beam expanding element 1a.

The Reconnaissance or Movie Systems

In the embodiments of the reconnaissance (or 3-D movie/video camera) system 100, the 2-D sensor 4 may or may not be present and typically the pulse of light from the pulsed light source 1 has a beam divergence which illuminates many or all target pixels; 1000 pixels is typical. A beam expanding element 1a, typically a diffuser, may be employed to control the divergence of the laser beam. 3-D image data is transferred to the embedded computer 34 or computer 5 in real time for each pulse of light and the 3-D image constructed from the scan. Typically the laser pulse repetition frequency is 0.5-10,000 Hz and may depend upon the time dependence and desired time resolution of the scene being captured. If the 2-D sensor is present the object of interest may be acquired with the 2-D sensor and the 3-D sensor used for target identification (ID). A typical system of this kind may be a rifle sight where the 2-D sensor is an IR sensor and the control computer 5, under human operator control, displays the 3-D data to the operator who makes the decision to respond. The rifle is the response system in this case. The operator could of course be absent from the reconnaissance system 100 or at a remote location. The 2-D sensor data may be overlaid on the 3-D data to enhance the target recognition. This overlay is sometimes referred to as texturing. The results of panning the 3-D reconnaissance camera over a scene with or without the 2-D overlay, at a frame rate of typically 30 Hz, where typically one laser pulse covers the full field of view, is a 3-D movie/video, hence 3-D movie/video camera. Overlaying lower spatial (x,y) resolution 3-D FPAs with higher spatial resolution 2-D FPAs increases the realism or target ID probability. Lower spatial resolution 3-D FPAs are desirable if the time resolution of the scene requires full frames of data since the more 3-D pixels required at one time the higher the laser energy required. Under those circumstances where full frames of 3-D data are required at high speed the mirror system 2 is not used and the laser 1 is oriented to illuminate the full field of view.

In another preferred embodiment of the reconnaissance or 3-D movie/video camera system 100 the beam shaping element 1a can be varied so that the illuminated field of view of the 3-D sensor 3 can be varied from the full field of view of the sensor to a few or a single pixel. Thereby the system 100 3-D sensor 3 use can be continuously varied from a full field of view 3-D imager to a range finder. The smaller the illumination field of view, or beam divergence, the longer the range that is possible with a given laser power; with a single pixel illumination field of view the greatest range can be achieved.

Uses of the Movie System

One particular use of the movie system of the present invention is to capture three dimensional motion of figures for incorporation into game machines. In particular the invention enables a single camera, without the complexities of multiple lens systems employing parallax, to capture the third dimension of characters participating in a sports event such as a football game. From the data captured by the 3D camera persons of skill in the programming art could enable the played hack scene to be rotated and approached from different geometrical points of view.

The Laser Designation System

In the laser designation embodiments 100 the invention is passive in its acquisition mode; the laser 1, and mirror system 2 is not used. Neither is the 2-D sensor 4 typically used. When used as a laser designator the objective is to locate the x,y position of a target being designated by a pulsed laser beam from an independent, typically not collocated, light source. Light scattering off the designated target is focused by the optics 7 onto the focal plane 10 of the 3-D sensor. One or at most a few pixels 16 respond to the light. The position of these pixels on the 3-D FPA 10 is determined when the whole array 15 is read out into the embedded computer 34 or the control computer 5 and the computer alerts the response system 99 to the x,y coordinates of the target. Typically the x,y position of the target is defined by the x,y position of the laser spot on the 3-D FPA 10 and the focal length of the receive optics 7. The computer may identify the designation laser using pulse repetition frequency or pulse shape matching algorithms. Under some circumstances both pulse repetition frequency and pulse shape may be used to identify the designation laser. A typical response system is a missile system.

When the laser designator 100 is being illuminated directly by a laser beam, light is focused by the optics 7 onto the focal plane 10 of the 3-D sensor. One or at most a few pixels 16 respond to the light. The position of these pixels on the 3-D FPA 10 is determined when the whole array 15 is read out into the embedded computer 34 or control computer 5 and the computer alerts the response system 99 to the x,y coordinates of the laser beam. Typically the x,y position of the target is defined by the x,y position of the laser spot on the 3-D FPA 10 and the focal length of the receive optics 7. A typical response system is the reconnaissance embodiment 100 of the present invention to identify the laser source.

When the image tube FPA 10 is used with the 3-D sensor 3 in any of the embodiments, laser light passes through the window 95 and interacts with the photocathode 98 producing an electron, e. The electron is accelerated by the internal electric field E to a relatively high energy, typically measured in KeV, until impact of the electron with the detector array 15 causes the generation of many electron-hole pairs. Either the electrons or the holes are swept into the ROIC 14, though the metal bump 18, by an electric field internal to the detector, and the process is then the same as for the solid state array depicted in FIG. 4.

What is claimed is:

1. A navigation system comprising:
    a pulsed laser light source;
    a beam shaping element;
    a 3D sensor having a field of view and including,
        a lens system,
        a sensor housing,
        a 3D focal plane array mounted to a platform, the 3D focal plane array having a light sensitive detector array formed as a regular geometric array of pixels in a focal plane of said lens system, and the light sensitive detector array mated to a readout integrated circuit, the readout integrated circuit having a corresponding regular geometric array of unit cell electronic circuits, and each unit cell electronic circuit having an input amplifier electrically connected to a pixel of the light sensitive detector array, and
        drive electronics adapted to provide a clock signal to the readout integrated circuit;
    a 2D sensor adapted to sense and detect objects in the field of view of the 3D sensor;
    a computer adapted to process data from the 3D focal plane array and provide an activation command; and
    a response system adapted to produce a change in direction of the platform responsive to the activation command from said computer.

2. The navigation system of claim 1 wherein the response system is selected from the set of ailerons and steering.

3. The navigation system of claim 1 wherein the light sensitive detector array is an array of semiconductor photodiodes selected from the set of PIN photodiodes and APO photodiodes.

4. The navigation system of claim 1 wherein the pixels of the light sensitive detector array are connected to the unit cell electronic circuits of the readout integrated circuit through a plurality of metallic bumps.

5. The navigation system of claim 1 wherein the pulsed laser light source is a laser diode.

6. A navigation system comprising:
a pulsed laser light source;
a beam shaping element;
a 3D sensor having a field of view and including
  a lens system,
  a sensor housing,
  a 3D focal plane array mounted to a platform, the 3D focal plane array having a light sensitive detector array formed as a regular geometric array of pixels in a focal plane of said lens system, and the light sensitive detector array mated to a readout integrated circuit, the readout integrated circuit having a corresponding regular geometric array of unit cell electronic circuits, and each unit cell electronic circuit having an input amplifier electrically connected to a pixel of the light sensitive detector array, and
  drive electronics adapted to provide a clock signal to the readout integrated circuit;
a 2D sensor adapted to sense and detect objects in the field of view of the 3D sensor;
a computer adapted to process data from the 3D focal plane array and provide an activation command; and
a response system adapted to produce a change in speed of the platform responsive to the activation command from said computer.

7. The navigation system of claim 6 wherein the response system is selected from the set of an accelerator and brakes.

8. The navigation system of claim 6 wherein the light sensitive detector array is an array of semiconductor photodiodes selected from the set of PIN photodiodes and APO photodiodes.

9. The navigation system of claim 6 wherein the pixels of the light sensitive detector array are connected to the unit cell electronic circuits of the readout integrated circuit through a plurality of metallic bumps.

10. The navigation system of claim 6 wherein the pulsed laser light source is a laser diode.

11. A collision avoidance system comprising:
a pulsed laser light source;
a beam shaping element;
a 3D sensor having a field of view and having
  a lens system,
  a sensor housing,
  a 3D focal plane array mounted to a platform, the 3D focal plane array having a light sensitive detector array formed as a regular geometric array of pixels in a focal plane of said lens system, and the light sensitive detector array mated to a readout integrated circuit, the readout integrated circuit having a corresponding regular geometric array of unit cell electronic circuits, and each unit cell electronic circuit having an input amplifier electrically connected to a pixel of the light sensitive detector array, and
  drive electronics adapted to provide a clock signal to the readout integrated circuit;
a 2D sensor adapted to sense and detect objects in the field of view of the 3D sensor;
a computer adapted to process data from the 3D focal plane array, identify an object to be avoided, and provide an activation command; and
a response system adapted to produce a change in the velocity vector of the platform responsive to the activation command from said control computer.

12. The navigation system of claim 11 wherein the response system is selected from the set of ailerons, steering, brakes, and an accelerator.

13. The navigation system of claim 11 wherein the light sensitive detector array is an array of semiconductor photodiodes selected from the set of PIN photodiodes and APO photodiodes.

14. The navigation system of claim 11 wherein the pixels of the light sensitive detector array are connected to the unit cell electronic circuits of the readout integrated circuit through a plurality of metallic bumps.

15. The navigation system of claim 11 wherein the pulsed laser light source is a laser diode.

16. The navigation system of claim 11 wherein each unit cell of the readout integrated circuit has a pulse detection circuit.

17. The navigation system of claim 11 wherein each unit cell of the readout integrated circuit has a digital counter configured as a timing circuit.

* * * * *